US010596638B2

(12) United States Patent
Shimizu et al.

(10) Patent No.: US 10,596,638 B2
(45) Date of Patent: Mar. 24, 2020

(54) LATHE PROVIDED WITH ECCENTRICITY ADJUSTMENT MECHANISM (71) Applicant: O-M LTD., Osaka-shi, Osaka (JP)

(72) Inventors: Tatsuo Shimizu, Nagaoka (JP); Takio Nakamura, Nagaoka (JP); Hirofumi Nakakubo, Nagaoka (JP); Akira Nishiyama, Nagaoka (JP)

(73) Assignee: O-M LTD., Osaka-shi, Osaka (JP)

( * ) Notice: Subject to any disclaimer, the term of this patent is extended or adjusted under 35 U.S.C. 154(b) by 8 days.

(21) Appl. No.: 15/768,956

(22) PCT Filed: Oct. 7, 2016

(86) PCT No.: PCT/JP2016/079946
§ 371 (c)(1),
(2) Date: Apr. 17, 2018

(87) PCT Pub. No.: WO2017/069002
PCT Pub. Date: Apr. 27, 2017

(65) Prior Publication Data
US 2018/0304379 A1 Oct. 25, 2018

(30) Foreign Application Priority Data

Oct. 20, 2015 (JP) .................................. 2015-206632

(51) Int. Cl.
*B23B 31/36* (2006.01)
*B23Q 1/52* (2006.01)
(Continued)

(52) U.S. Cl.
CPC ............... *B23B 31/36* (2013.01); *B23B 3/10* (2013.01); *B23Q 1/009* (2013.01); *B23Q 1/015* (2013.01);
(Continued)

(58) Field of Classification Search
CPC ....... B23B 31/36; B23B 3/10; B23B 2231/22; B23Q 1/009; B23Q 1/015; B23Q 1/01;
(Continued)

(56) References Cited

U.S. PATENT DOCUMENTS 2,763,488 A 9/1956 Buck
6,128,985 A * 10/2000 Muster ................ B23Q 1/5468
82/1.4

FOREIGN PATENT DOCUMENTS

JP 54-039280 A 3/1979
JP 2004-223702 A 8/2004
(Continued)

OTHER PUBLICATIONS

International Search Report for PCT/JP2016/079946 dated Dec. 13, 2016.

*Primary Examiner* — Sunil K Singh
*Assistant Examiner* — Paul M Janeski
(74) *Attorney, Agent, or Firm* — Sughrue Mion, PLLC (57) ABSTRACT The present invention provides a lathe that is provided with an eccentricity adjustment mechanism that makes it possible for electrical components that are readily affected by the environment to be eliminated from the turntable; for slip rings in particular, which exhibit problems in terms of the durability of signal transmission during high-speed rotation, to be eliminated as well, and for safe and stable adjustment of workpiece eccentricity to be easily achieved. A lathe provided with an eccentricity adjustment mechanism, in which a linear motion guide unit (6) is provided in an inclined state in an engaging part of the center part of a turntable (1) and an axial-direction-movement part (5A) of a center shaft (5); and, due to the center shaft (5) being moved, the turntable (1) moves in the radial direction by the radial pressing force generated by the linear motion guide (Continued)

unit (6) being inclined, and the eccentricity of the workpiece (3) is adjusted.

3 Claims, 5 Drawing Sheets

(51) Int. Cl.
  *B23B 3/10* (2006.01)
  *B23Q 1/00* (2006.01)
  *B23Q 1/01* (2006.01)
  *B23Q 1/48* (2006.01)
  *B23Q 17/00* (2006.01)
(52) U.S. Cl.
  CPC .......... *B23Q 1/522* (2013.01); *B23B 2231/22* (2013.01); *B23Q 1/4804* (2013.01); *B23Q 2017/001* (2013.01); *B23Q 2220/004* (2013.01)
(58) Field of Classification Search
  CPC ............. B23Q 1/522; B23Q 2017/001; B23Q 1/4804; B23Q 2220/004
  See application file for complete search history.

(56) References Cited

FOREIGN PATENT DOCUMENTS

| | | |
|---|---|---|
| JP | 2005-138216 A | 6/2005 |
| JP | 2009-184083 A | 8/2009 |

\* cited by examiner

LATHE PROVIDED WITH ECCENTRICITY ADJUSTMENT MECHANISM

CROSS REFERENCE TO RELATED APPLICATIONS

This application is a National Stage of International Application No. PCT/JP2016/079946 filed Oct. 7, 2016, claiming priority based on Japanese Patent Application No. 2015-206632 filed Oct. 20, 2015.

BACKGROUND OF THE INVENTION

1. Field of the Invention

The present invention relates to a lathe provided with an eccentricity adjustment mechanism that is able to make fine adjustments to the eccentricity of a workpiece that is centered on a turntable.

2. Description of the Related Art

Eccentricity adjustment mechanisms are provided to lathes that are provided with a workpiece-fixing device for centering and fixing a workpiece on a rotation- or indexing-controlled turntable, and processing, using a movement-controlled processing tool, the workpiece fixed by the workpiece-fixing device. The eccentricity adjustment mechanism can finely adjust the eccentricity of the workpiece by moving and adjusting the workpiece-fixing device (chuck device) for fixing the workpiece on the turntable in, for example, the radial direction, since it may be desirable to make the workpiece eccentric to the center of rotation by a very small amount.

However, since conventional eccentricity adjustment mechanisms are so configured to move and adjust the chuck device, a ball screw for driving the chuck device on the turntable, a servo motor for rotationally driving the ball screw, or other electrical components are required. Furthermore, a slip ring, etc., for delivering signals and power between a fixed part and a rotating part must also be provided.

A risk is accordingly presented that the components will deteriorate due to the effect of coolant water, etc., and since signals and power are delivered between the fixed part and the rotating part via the slip ring, difficulties are encountered in achieving safe and stable adjustment of eccentricity, diversified effort is required from a design perspective as well, and design, manufacture, etc., are not facilitated.

SUMMARY OF THE INVENTION

Technical Problem

In view of the problems described above, it is an object of the present invention to provide a lathe provided with an eccentricity adjustment mechanism that makes it possible for electrical components that are readily affected by the environment to be eliminated from the turntable, for slip rings, which present particular problems in terms of the durability of signal transmission during high-speed rotation, to also be eliminated, and for the safe and stable adjustment of workpiece eccentricity to be easily achieved.

Solution to Problem

A summary of the present invention will be described with reference to the accompanying drawings.

The present invention relates to a lathe provided with an eccentricity adjustment mechanism, the lathe being provided with a workpiece-fixing device 2 on a turntable 1 controlled for rotation or controlled for indexing, and a workpiece 3 fixed by the workpiece-fixing device 2 and rotated or indexed on the turntable 1 being processed using a movement-controlled processing tool 4, wherein the lathe is characterized in being provided with an eccentricity adjustment mechanism H that is provided so as to be capable of moving the turntable 1 in the radial direction with respect to the rotation center and provided so as to be capable of adjusting the eccentricity of the workpiece 3; an axial-direction-movement part 5A that moves in the axial direction being provided on a center shaft 5 of the turntable 1; a linear motion guide unit 6 being provided in an inclined state in an engaging part of the center part of the turntable 1 and the axial-direction-movement part 5A of the center shaft 5; and, due to the axial-direction-movement part 5A of the center shaft 5 being moved in the axial direction, the turntable 1 moving in the radial direction by the radial pressing force generated by the linear motion guide unit 6 being inclined, and the eccentricity of the workpiece 3 being adjusted.

The lathe provided with an eccentricity adjustment mechanism according to a first aspect, wherein the lathe is characterized in that a slide rail 6A is provided to one side represented by either the axial-direction-movement part 5A provided to the center shaft 5 or an engagement-receiving part 1A provided at the center part of the turntable 1 to which the axial-direction-movement part 5A is engaged so as to be capable of moving in the vertical direction, which is the axial direction; a slide guide 6B with which the slide rail 6A is slidably engaged is provided to the other represented side; and the linear motion guide unit 6, which comprises the slide rail 6A and the slide guide 6B, is provided in the engaging part of the center shaft 5 and the turntable 1; the eccentricity adjustment mechanism H being configured so that the linear motion guide unit 6 is provided in an inclined state, and, due to the axial-direction-movement part 5A being moved in the axial direction, the radial pressing force is generated in the engagement-receiving part 1A, and the turntable 1 moves radially to become eccentric by an amount that corresponds to the movement stroke of the axial-direction-movement part 5A.

The lathe provided with an eccentricity adjustment mechanism according to a second aspect, wherein the lathe is characterized in that: the turntable 1 is configured so that a workpiece setting table 9 on which the workpiece-fixing device 2 is provided is provided on a table base 8 so as to be capable of moving in the radial direction, which is the horizontal direction, the table base 8 rotating horizontally on a table bed 7; the center shaft 5, which rotates together with the table base 8 of the turntable 1, is provided so as to be capable of moving in the vertical direction, which is the axial direction, with respect to the table base 8, the upper end part of the center shaft 5 being the axial-direction-movement part 5A; and the axial-direction-movement part 5A and the engagement-receiving part 1A provided at the center part of the workpiece setting table 9 of the turntable 1 are engaged and connected so as to be interposed by the linear motion guide unit 6, which is disposed to be radially inclined; the eccentricity adjustment mechanism H being configured so that, by the center shaft 5 being driven in the vertical direction by a shaft vertical driving device 10, the workpiece setting table 9 is moved in the horizontal direction with respect to the table base 8 of the turntable 1 and the eccentricity of the workpiece 3 is adjusted.

The lathe provided with an eccentricity adjustment mechanism according to a third aspect, wherein the lathe is characterized in that the workpiece setting table 9 is provided so as to be capable of moving on the table base 8 of the turntable 1 in the radial direction, which is the horizontal direction, interposed by an eccentric slide guide part 11; and an eccentric fixing device 12 for moving the workpiece setting table 9 in the radial direction to adjust and then fix the eccentricity is provided to the table base 8 so as to be capable of being releasably fixed.

The lathe provided with an eccentricity adjustment mechanism according to any one of first to fourth aspects, wherein the lathe is characterized in that the linear motion guide unit 6 is provided at individual engaging parts of the axial-direction-movement part 5A of the center shaft 5 and the engagement-receiving part 1A of the center part of the workpiece setting table 9 of the turntable 1; and one linear motion guide unit 6, which is provided to the workpiece setting table 9, is disposed in an inclined state with respect to another linear motion guide unit 6, which is vertically provided to the table base 8, so as to be inclined further radially outward higher up.

Advantageous Effects of the Invention

Due to being configured as described above, the present invention is a lathe provided with an eccentricity adjustment mechanism that makes it possible for electrical components that are readily affected by the environment to be eliminated from the turntable, for slip rings, which present particular problems in terms of the durability of signal transmission during high-speed rotation, to also be eliminated, and for the safe and stable adjustment of workpiece eccentricity to be easily achieved.

The invention set forth in the second through fifth aspects is a lathe provided with an even more practical eccentricity adjustment mechanism with which the present invention can be easily realized with a further simplified configuration.

DESCRIPTION OF THE PREFERRED EMBODIMENTS

Figure 1:
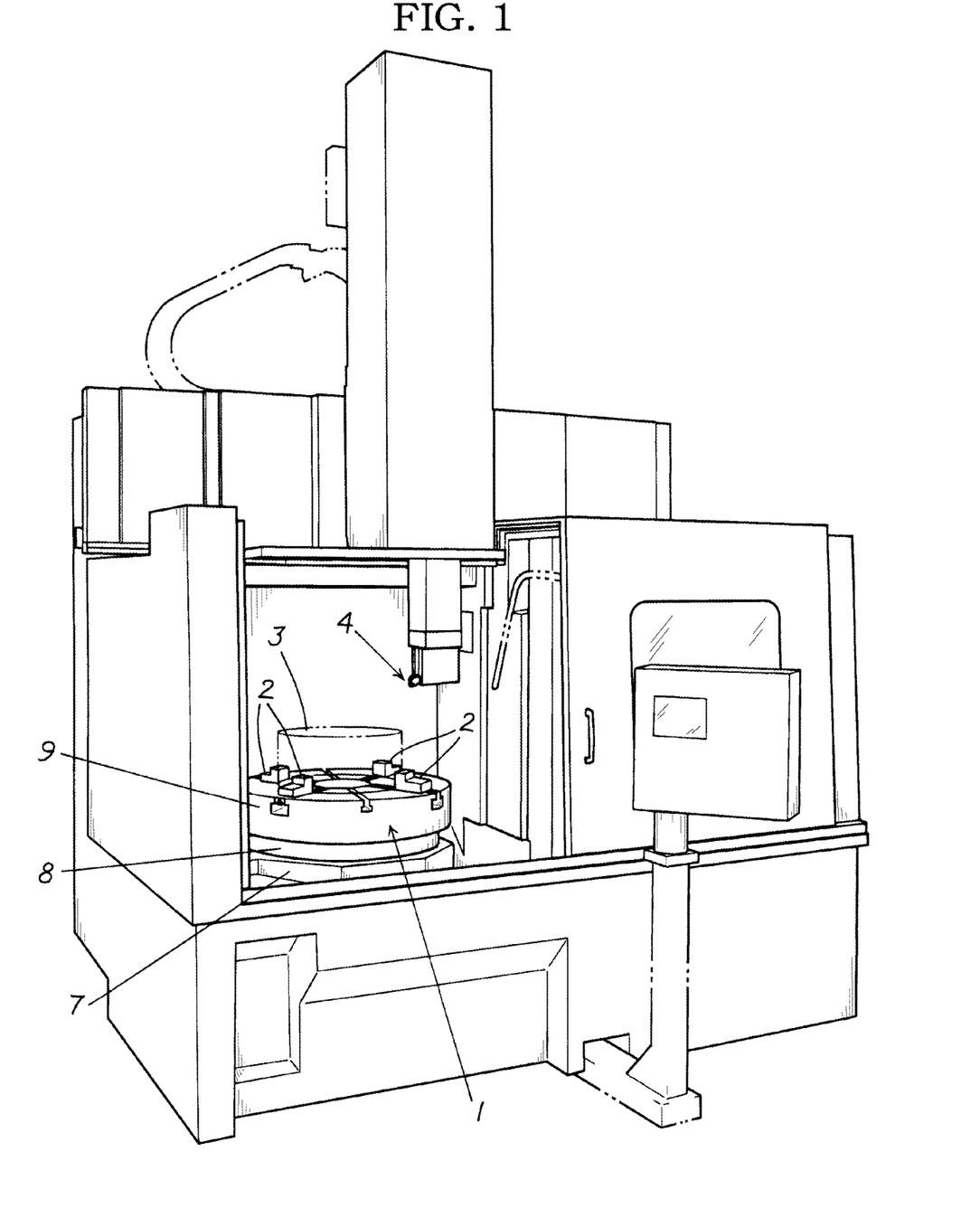
FIG. 1 is a schematic perspective view of the present example.
Figure 2:
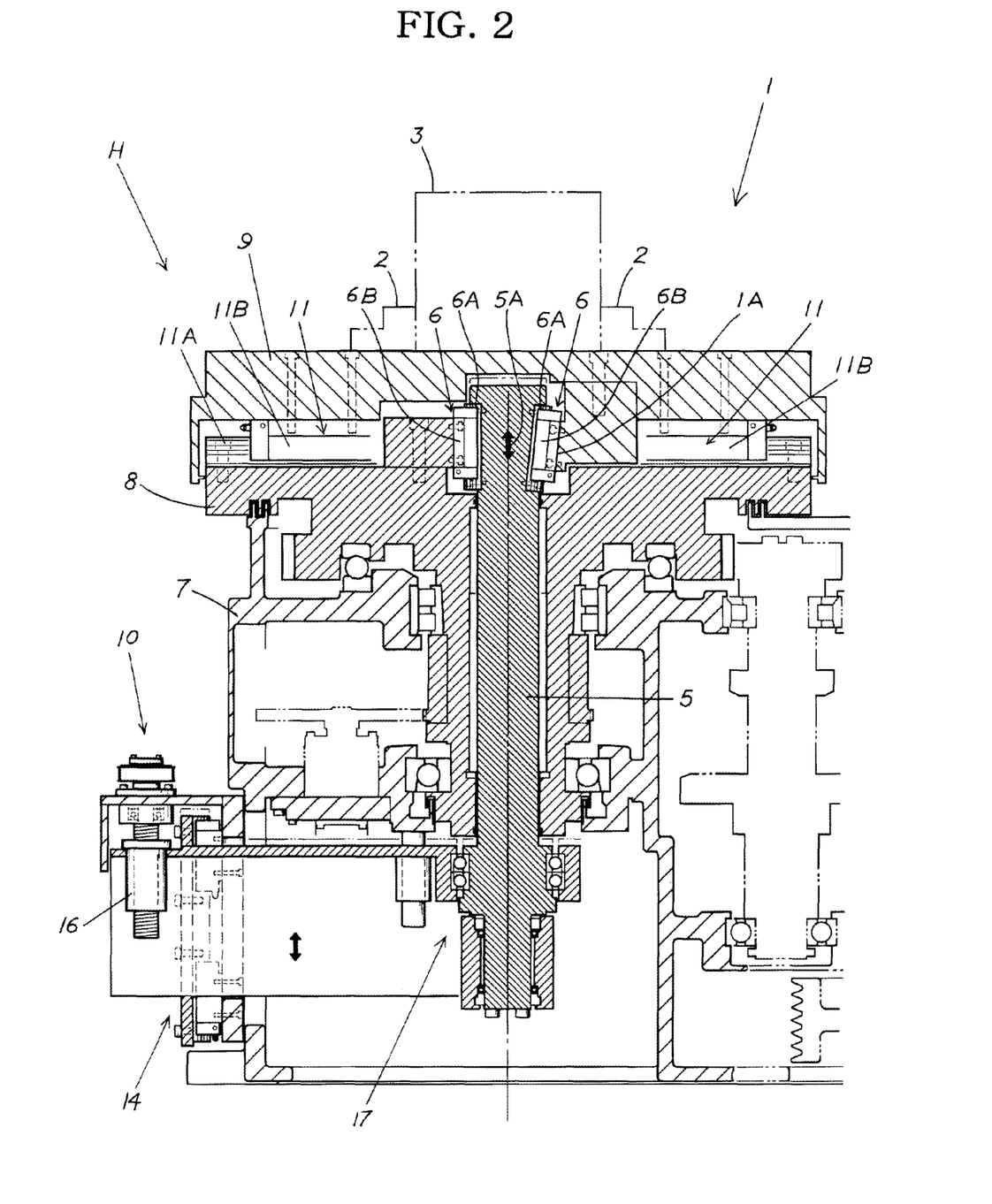
FIG. 2 is an explanatory front sectional view of the present example.
Figure 3:
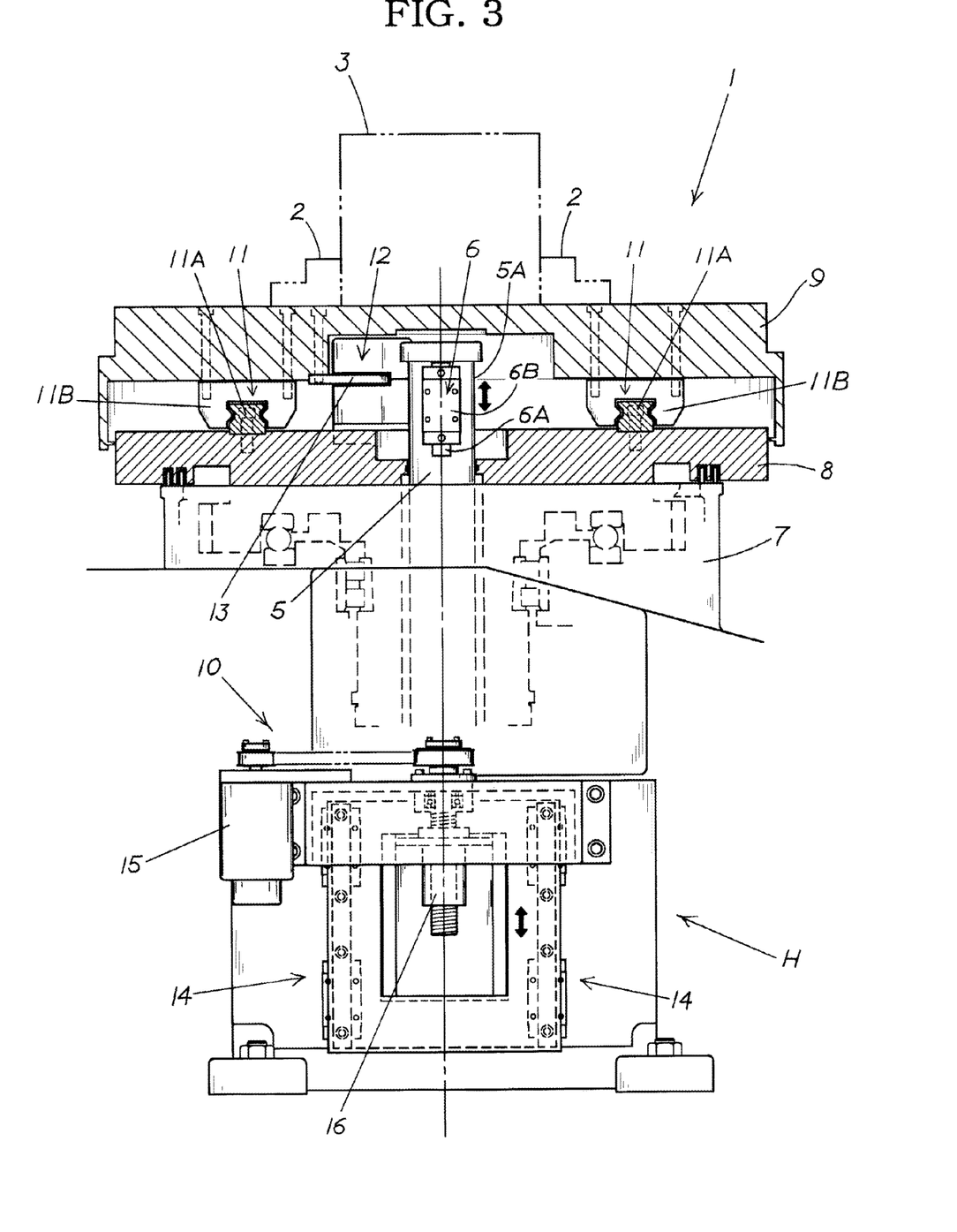
FIG. 3 is a partially cut-away explanatory side view of the present example.
Figure 4:
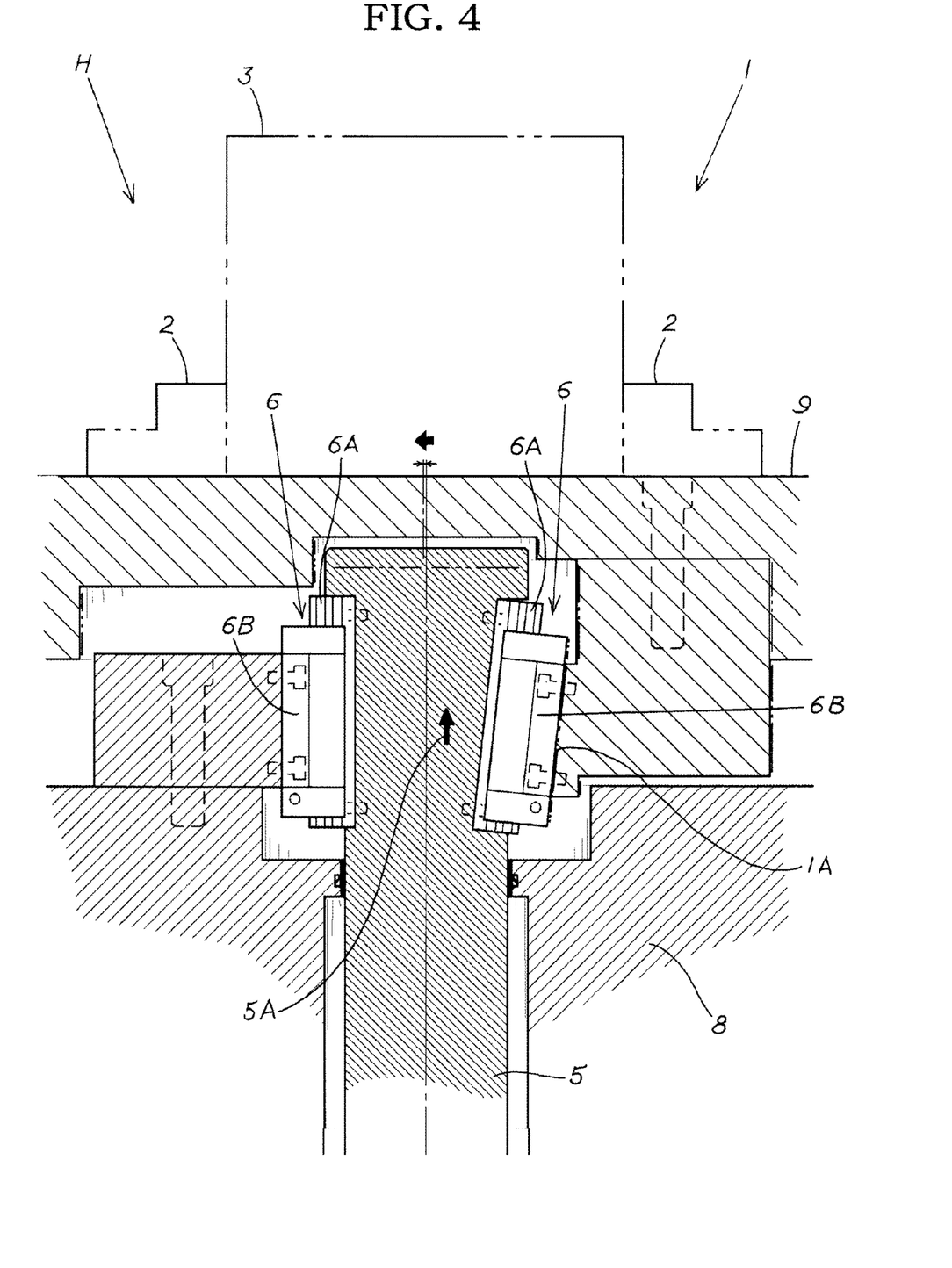
FIG. 4 is an enlarged front sectional view of a main section of the present example.
Figure 5:
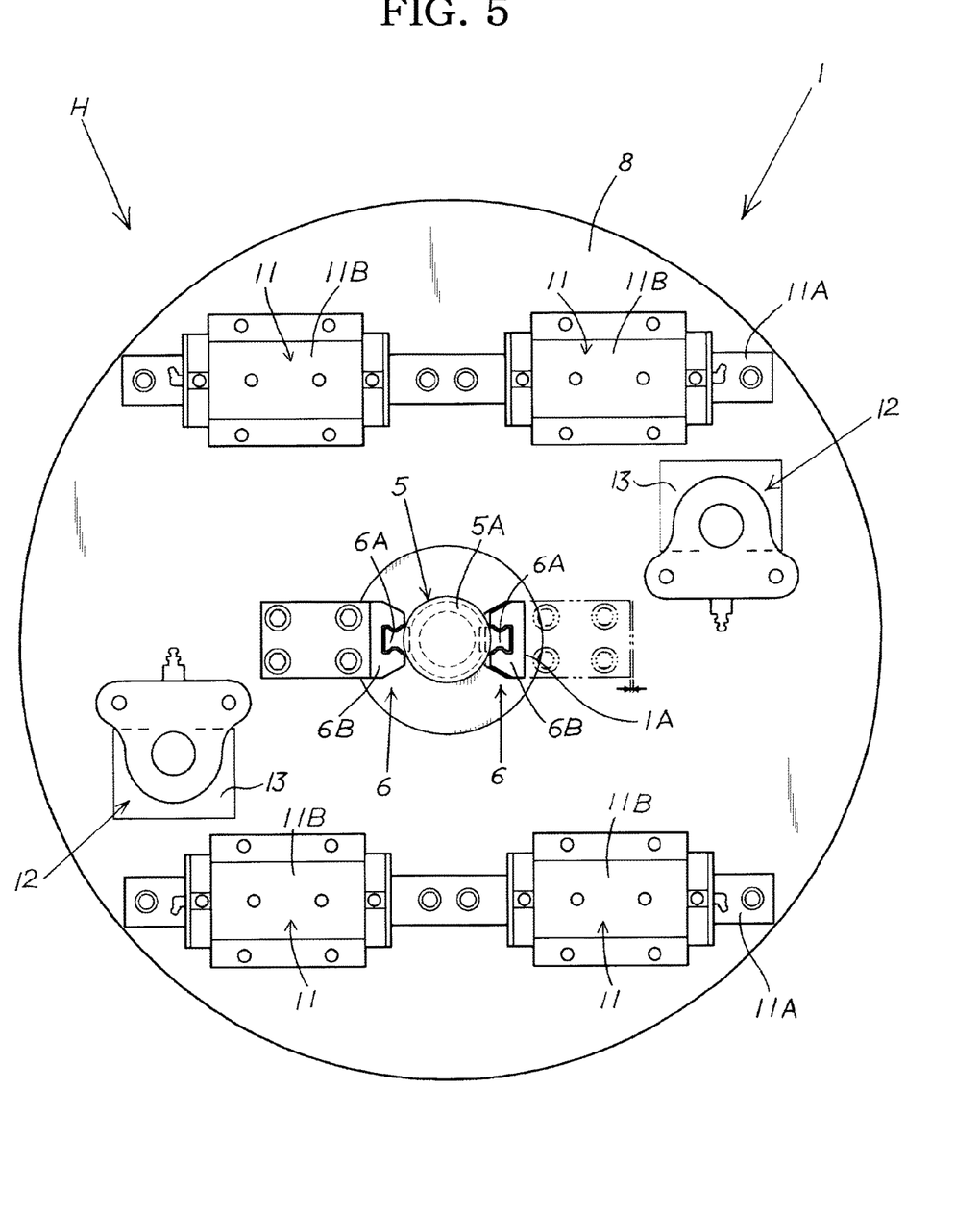
FIG. 5 is an explanatory planar view of a table base of the present example in which a workpiece setting table of a turntable is removed.

A preferred embodiment of the present invention will be briefly described indicating the actions of the present invention on the basis of the drawings.

In order to make a workpiece 3 eccentric by a very small amount, a turntable 1 may be adjusted to horizontally move in the radial direction; for example, when an eccentric fixing device 12 is released, a shaft vertical driving device 10 is driven and an axial-direction-movement part 5A of a center shaft 5 that rotates together with a table base 8 of the turntable 1 is moved vertically with respect to the table base 8 of the turntable 1, a linear motion guide unit 6 provided in an engaging part, in which the axial-direction-movement part 5A and an engagement-receiving part 1A of a workpiece setting table 9 of the turntable 1 are engaged and connected, is installed in an inclined state. Therefore, the workpiece setting table 9 of the turntable 1 provided so as to be capable of moving, e.g., in the radial direction moves a very small amount in the radial direction with respect to the table base 8 of the turntable 1.

That is, given that the linear motion guide unit 6 interposed between the axial-direction-movement part 5A and the engagement-receiving part 1A of the turntable 1 is inclined, when the axial-direction-movement part 5A is moved in the axial direction by the shaft vertical driving device 10, radial pressing force is generated in the engagement-receiving part 1A of the turntable 1. This causes the workpiece setting table 9 of the turntable 1 to be made eccentric by moving a very small amount in the radial direction (horizontal direction) with respect to the table base 8 of the turntable 1.

Accordingly, it is possible to adjust the eccentricity of the workpiece 3 on the workpiece setting table 9 of the turntable 1 by adjusting, for example, the vertical movement driving amount of the shaft vertical driving device 10.

Consequently, by adopting a configuration in which: electrical components that are readily affected by the environment are eliminated from the turntable; a slip ring, etc., for delivering signals or power is not provided; and the linear motion guide unit 6, which is provided on the axial movement part 5A of the center shaft 5 and the engagement receiving part 1A of the turntable 1, is disposed at an incline, merely adjusting the amount of vertical driving of the vertically moved center shaft 5 makes it possible to finely adjust the eccentricity of the workpiece 3 in accordance with the amount of vertical driving. Accordingly, it is possible to realize an eccentricity adjustment mechanism with a simpler configuration than in a conventional configuration, and it is possible to provide a lathe provided with an innovative eccentricity adjustment mechanism that is able to carry out safe and stable adjustment of eccentricity.

For example, as with the invention set forth in the second and third aspects, the turntable 1 is configured such that the workpiece setting table 9 is provided so as to be capable of moving in the radial direction (horizontal direction) on a table base 8 provided to be capable of rotating horizontally on the table bed 7 and is configured so as be releasably fixed by the eccentric fixing device 12. The center shaft 5 of the table base 8 of the turntable 1 rotates together with the table base 8 and the workpiece setting table 9, but is provided so to be capable of moving vertically with respect to the table base 8 and the workpiece setting table 9. The center shaft 5 is capable of moving vertically with respect to the table base 8, the upper end part of the center shaft 5 being defined as the axial-direction-movement part 5A. The axial-direction-movement part 5A and the engagement-receiving part 1A of the workpiece setting table 9 of the turntable 1 are engaged and connected via the linear motion guide unit 6, which is a linear motor (LM) guide, etc., and the linear motion guide unit 6 is disposed to be inclined. Due to this configuration, it is possible, merely by controlling the vertical driving of the center shaft 5, to move the workpiece setting table 9 on the table base 8 by a very small amount 5 and adjust the eccentricity of the workpiece 3, and it is possible to more easily realize a lathe provided with a highly exceptional eccentricity adjustment mechanism that is able to carry out safe and stable adjustment of eccentricity using an extremely simple configuration.

EXAMPLES

A specific example of the present invention will be described with reference to the drawings.

In the present example, a turntable 1 that is rotation-controlled by a rotation drive device during turning and index-controlled by an indexing drive device during drilling is provided with a workpiece-fixing device 2 (chuck device 2) for removably centering and chucking the workpiece 3, and a lathe (multi-function machine) in which the workpiece 3 that is centered and fixed by the workpiece-fixing device 2 is processed using a processing tool 4 such as a numerically controlled turning tool or a rotary tool is provided with an eccentricity adjustment mechanism H for finely adjusting the eccentricity of the workpiece 3.

According to the eccentricity adjustment mechanism H of the present example, the turntable 1 is provided so as to be capable of moving in the horizontal direction, which is the radial direction, with respect to the rotation center, an axial-direction-movement part 5A that moves in the axial direction is provided to the upper end part of the center shaft 5 of the turntable 1, a linear motion guide unit 6 is provided in an inclined state in the engaging part of the center part of the turntable 1 and the axial-direction-movement part 5A of the center shaft 5, and by moving the axial-direction-movement part 5A of the center shaft 5 in the vertical direction, which is the axial direction, the workpiece setting table 9 on a top part of the turntable 1 moves in the radial direction by the radial pressing force caused by the linear motion guide unit 6 being inclined, and the eccentricity of the centered workpiece 3 can be adjusted.

Specifically, the eccentricity adjustment mechanism H is configured such that a slide rail 6A is provided to one side represented by either the axial-direction-movement part 5A provided to the upper end part of the center shaft 5 or the engagement-receiving part 1A provided at the center part of the workpiece setting table 9 of the turntable 1 to which the axial-direction-movement part 5A engages in a manner allowing movement in the vertical direction, and a slide guide 6B with which the slide rail 6A slidably engages is provided to the other represented side. The linear motion guide unit 6, which comprises the slide rail 6A and the slide guide 6B, is provided in the engaging part of the center shaft 5 and the turntable 1. The linear motion guide unit 6 is provided in an inclined state in the radial direction, and by moving the axial-direction-movement part 5A in the vertical direction, radial pressing force is generated in the engagement-receiving part 1A and the turntable 1 moves radially to become eccentric by an amount that corresponds to the movement stroke of the axial-direction-movement part 5A.

The turntable 1 of the present example is configured such that the workpiece setting table 9, on which is provided the workpiece-fixing device 2 for centering and fixing the workpiece 3, is provided so as to be capable of moving in the radial direction (horizontal direction) on the table base 8 that rotates on the table bed 7. The center shaft 5 rotating together with the table base 8 and the workpiece setting table 9 of the turntable 1 is provided to be capable of moving vertically with respect to the table base 8 and the workpiece setting table 9, and the upper end part of the center shaft 5 is the axial-direction-movement part 5A. The axial-direction-movement part 5A and the engagement-receiving part 1A provided at the center part of the workpiece setting table 9 of the turntable 1 are engaged and connected via the linear motion guide unit 6 disposed inclined in the radial direction. The eccentricity adjustment mechanism H is configured such that by having the shaft vertical driving device 10 drive the center shaft 5 in the vertical direction, the workpiece setting table 9 is moved in the radial direction with respect to the table base 8 of the turntable 1 so as to finely adjust the eccentricity of the workpiece 3.

The workpiece setting table 9 is provided so as to be capable of moving in the radial direction via an eccentric slide guide part 11 on the table base 8 of the turntable 1. An eccentric fixing device 12 for moving the workpiece setting table 9 in the radial direction to adjust and subsequently fix the eccentricity is provided to the table base 8 so as to be capable of being releasably fixed. When, after the eccentric fixing device 12 is released, a shaft vertical driving device 10 is driven, the axial-direction-movement part 5A of the center shaft 5 that rotates together with the table base 8 and the workpiece setting table 9 of the turntable 1 is moved vertically with respect to the table base 8 of the turntable 1, the linear motion guide unit 6 provided in the engaging part, in which the axial-direction-movement part 5A and the engagement-receiving part 1A of the workpiece setting table 9 of the turntable 1 are engaged and connected, is installed in an inclined state in the radial direction. Therefore, the workpiece setting table 9 of the turntable 1 provided so as to be capable of moving in the radial direction moves a very small amount in the radial direction with respect to the table base 8 of the turntable 1, and the eccentricity of the workpiece 3 is adjusted, so that a movement position of the workpiece setting table 9 can be fixed using the adjusted eccentric fixing device 12.

The turntable 1 of the present example shall now be further described. The table base 8 is provided so as to be capable of rotating horizontally on the table head 7, which comprises an upper supporting part that supports the workpiece setting table on the table base 8 and a center shaft part that rotatably engages with a supporting part of the table head 7. A guide rail 11A extending in the radial direction is provided as the eccentric slide guide part 11 in the upper supporting part of the table base 8. A slide guide 11B that slidably engages with the guide rail 11A is provided to the rear surface of the workpiece setting table 9. The work setting table 9 is provided to the upper supporting part of the table base 8 so as to be capable of rotating in the radial direction, with the slide guide part 11 being interposed therebetween. The turntable 1 is provided with the eccentric fixing device 12, which chucks, from the vertical direction, a chucked plate part 13 of the workpiece setting table 9 with respect to the table base 8 after the movement adjustment has been made and fixes the chucked plate part 13 at the moved position after the adjustment.

The center shaft 5 is mounted in the table base 8 so as to be capable of moving in the vertical direction, which is the axial direction, and rotates together with the table base 8 in the center shaft part of the table base 8. The center shaft 5 is controlled so to be vertically moved by the shaft vertical driving device 10 provided to the table bed 7.

Specifically, a ball screw 16 is rotatably driven by a servomotor 15 provided as a drive source of the shaft vertical driving device 10, whereby the supporting part 17 provided at the lower end part of the center shaft 5 is guided in a vertical movement guide part 14 and finely moved vertically so as to allow control of the movement of the center shaft 5 in the vertical direction.

The upper end part of the center shaft 5, which is controlled to move vertically, is set as the axial-direction-movement part 5A, and the axial-direction-movement part 5A and the engagement-receiving part 1A provided in the center part of the workpiece setting table 9 of the turntable 1 are engaged and connected by the linear motion guide unit 6.

By having the table base 8 or the center shaft 5 rotatably driven, the work setting table 9 and the center shaft 5 also rotate together with the table base 8. However, the workpiece setting table 9 is eccentric with respect to the table base 8 in accordance with the amount of vertical movement of the center shaft 5 with respect to the table base 8, and the eccentricity of the workpiece 3 can be adjusted by controlling the movement of the center shaft 5.

As described above, the linear motion guide unit 6 is configured such that a slide rail 6A is provided to one side represented by either the axial-direction-movement part 5A provided to the upper end part of the center shaft 5 or the engagement-receiving part 1A provided at the center part of the workpiece setting table 9 of the turntable 1 to which the axial-direction-movement part 5A engages in a manner allowing movement in the vertical direction, and a slide guide 6B with which the slide rail 6A slidably engages is provided to the other represented side. The linear motion guide unit 6, which comprises the slide rail 6A and the slide guide 6B, is provided in the engaging part of the center shaft 5 and the turntable 1. The linear motion guide unit 6 is provided in an inclined state in the radial direction, and by moving the axial-direction-movement part 5A in the vertical direction, radial pressing force is generated in the engagement-receiving part 1A and the turntable 1 moves radially to become eccentric by an amount that corresponds to the movement stroke of the axial-direction-movement part 5A.

Specifically, a pair of linear motion guide units 6 are provided in the axial-direction-movement part 5A of the center shaft 5, with one of the linear motion guide units 6, which is vertically arranged, being disposed in an inclined state with respect to the other linear motion guide unit 6 so as to be inclined further radially outward higher up along the linear motion guide unit 6.

Described more specifically, in the present example, one linear motion guide unit 6, which connects the axial-direction-movement part 5A of the center shaft 5 and a slide receiving part of the center part of the table base 8 of the turntable 1, is disposed in the vertical direction, and the other linear motion guide unit 6, which connects the axial-direction-movement part 5A and the engagement-receiving part 1A of the center part of the workpiece setting table 9 of the turntable 1, is provided in an inclined state.

Specifically, in the linear motion guide units 6 of the present example, an LM guide is adopted, and a pair of slide rails 6A of the LM guide are provided to the outer side of the axial-direction-movement part 5A of the upper end part of the center shaft 5, one slide rail 6A being disposed in the vertical direction, and the other slide rail 6A being provided in a state of being inclined further outward higher up along the slide rail 6A. The slide guide 6B slidably engaged and connected with the one slide rail 6A is provided in the slide receiving part of the center part of the table base 8 of the turntable 1, and slidably guides vertical movement when the eccentricity of the axial-direction-movement part 5A (center shaft 5) is to be adjusted. The slide guide 6B engaged with the other slide rail 6A provided in an inclined state to the axial-direction-movement part 5A is provided in an inclination state likewise with respect to the engagement-receiving part 1A, which is provided to the center part rear surface of the workpiece setting table 9 of the turntable 1. By vertically moving the axial-direction-movement part 5A while being guided by the pair of linear motion guide units 6, a radial pressing force is generated whereby the workpiece setting table 9 is pressed in the radial direction with respect to the table base 8, so that the workpiece setting table 9 moves in the radial direction by an amount that corresponds to the vertical movement of the axial-direction-movement part 5A with respect to the table base 8, allowing the eccentricity of the workpiece 3 to be adjusted.

The LM guide of the present example adopted as the linear motion guide unit 6 is configured such that the slide rails 6A slidably engage with the slide guides 6B. The slide rails 6A slidably engage with the slide guides 6B with a ball retainer circulation device interposed therebetween, the ball retainer circulation device being movably accommodated in a ball circulation part, and having balls that are held by a ball retainer.

The present invention is not limited to the present example, it being possible to design the specific configuration of each configurational requirement as appropriate.

What is claimed is:

1. A lathe provided with an eccentricity adjustment mechanism, the lathe being provided with a workpiece-fixing device on a turntable controlled for rotation or controlled for indexing, and a workpiece fixed by the workpiece-fixing device and rotated or indexed on the turntable being processed using a movement-controlled processing tool, wherein the lathe is characterized in being provided with an eccentricity adjustment mechanism that is provided so as to be capable of moving the turntable in the radial direction with respect to the rotation center and provided so as to be capable of adjusting the eccentricity of the workpiece; an axial-direction-movement part that moves in the axial direction being provided on a center shaft of the turntable; a pair of linear motion guide units being provided in an engaging part of the center part of the turntable and the axial-direction-movement part of the center shaft; one of the pair of linear motion guide units being in inclined state and, due to the axial-direction-movement part of the center shaft being moved in the axial direction, the turntable moving in the radial direction by the radial pressing force generated by the linear motion guide unit being inclined, and the eccentricity of the workpiece being adjusted;

each of the linear motion guide unit comprises a slide rail and a slide guide, the slide rail is provided to one side represented by either the axial-direction-movement part provided to the center shaft or an engagement-receiving part provided at the center part of the turntable to which the axial-direction-movement part is engaged so as to be capable of moving in the vertical direction, which is the axial direction; and the slide guide with which the slide rail is slidably engaged is provided to the other represented side; and each of the linear motion guide units, which comprises the slide rail and the slide guide, is provided in the engaging part of the center shaft and the turntable; at least one of the linear motion guide units is provided in an inclined state, and, due to the axial-direction-movement part being moved in the axial direction, the radial pressing force is generated in the engagement-receiving part, and the turntable moves radially to become eccentric by an amount that corresponds to the movement stroke of the axial-direction-movement part, and each of the linear motion guide units is provided at respective individual engaging parts of the axial-direction-movement part of the center shaft and the engagement-receiving part of the center part of the turntable; the pair of linear guide portions comprising one linear motion guide unit and another linear motion guide unit, the one linear motion guide unit, which is provided to the workpiece setting table, is disposed in an inclined state with respect to the other linear motion guide unit, which is vertically provided to the table base, so as to be inclined further radially outward higher up.

2. The lathe provided with an eccentricity adjustment mechanism according to claim 1, wherein the lathe is characterized in that: the turntable is configured so that a workpiece setting table on which the workpiece-fixing device is provided is provided on a table base so as to be capable of moving in the radial direction, which is the horizontal direction, the table base rotating horizontally on a table bed; the center shaft, which rotates together with the table base of the turntable, is provided so as to be capable of moving in the vertical direction, which is the axial direction, with respect to the table base, the upper end part of the center shaft being the axial-direction-movement part; and the axial-direction-movement part and the engagement-receiving part provided at the center part of the workpiece setting table of the turntable are engaged and connected so as to be interposed by the linear motion guide unit, which is disposed to be radially inclined; the eccentricity adjustment mechanism being configured so that, by the center shaft being driven in the vertical direction by a shaft vertical driving device, the workpiece setting table is moved in the horizontal direction with respect to the table base of the turntable and the eccentricity of the workpiece is adjusted.

3. The lathe provided with an eccentricity adjustment mechanism according to claim 2, wherein the lathe is characterized in that the workpiece setting table is provided so as to be capable of moving on the table base of the turntable in the radial direction, which is the horizontal direction, interposed by an eccentric slide guide part; and an eccentric fixing device for moving the workpiece setting table in the radial direction to adjust and then fix the eccentricity is provided to the table base so as to be capable of being releasably fixed.

* * * * *